(12) United States Patent
Mühlbacher et al.

(10) Patent No.: US 6,984,444 B2
(45) Date of Patent: Jan. 10, 2006

(54) INTERIOR LINING COMPONENT

(75) Inventors: Richard Mühlbacher, Grassau (DE);
Oliver Schneider, München (DE)

(73) Assignee: Lear Corporation, Southfield, MI (US)

( * ) Notice: Subject to any disclaimer, the term of this patent is extended or adjusted under 35 U.S.C. 154(b) by 662 days.

(21) Appl. No.: 09/808,243

(22) Filed: Mar. 14, 2001

(65) Prior Publication Data
US 2001/0044005 A1 Nov. 22, 2001

(30) Foreign Application Priority Data
Mar. 15, 2000 (DE) ........................... 200 04 753 U

(51) Int. Cl.
*B32B 3/26* (2006.01)

(52) U.S. Cl. .................. 428/292.1; 428/158; 428/159; 428/160; 428/213; 428/315.9

(58) Field of Classification Search ................ 428/158, 428/160, 292.1, 159, 309.9, 614, 315.9, 617, 428/317.3, 319.3, 116, 315, 411.1, 309; 296/210, 296/211; 181/207, 224
See application file for complete search history.

(56) References Cited

U.S. PATENT DOCUMENTS

| | | | | |
|---|---|---|---|---|
| 4,136,226 A | * | 1/1979 | Gilman ........................ 428/159 |
| 4,330,584 A | * | 5/1982 | Doerer ........................ 428/91 |
| 4,479,992 A | * | 10/1984 | Haeseker et al. ............ 428/116 |
| 4,541,885 A | * | 9/1985 | Caudill, Jr. ................. 156/220 |
| 4,791,019 A | * | 12/1988 | Ohta et al. ................. 428/304.4 |
| 4,957,797 A | * | 9/1990 | Maeda et al. ................. 428/77 |
| 5,120,593 A | * | 6/1992 | Kurihara ...................... 428/174 |
| 5,211,593 A | * | 5/1993 | Schneider et al. ............ 441/65 |
| 5,614,285 A | * | 3/1997 | Gardill ........................ 428/156 |
| 6,214,456 B1 | | 4/2001 | Boyd et al. |
| 2003/0118806 A1 | * | 6/2003 | Schonebeck ............. 428/304.4 |

FOREIGN PATENT DOCUMENTS

| | | |
|---|---|---|
| DE | 40 15 739 A1 | 11/1991 |
| DE | 44 03 977 A1 | 8/1994 |
| DE | 44 44 505 A1 | 6/1996 |
| DE | 197 57 102 A1 | 6/1999 |
| DE | 0995667 * | 4/2000 |
| DE | 198 47 795 C1 | 5/2000 |
| DE | 198 47 804 C1 | 5/2000 |
| DE | 100 22 902 A1 | 3/2001 |
| DE | 201 02 194 U1 | 6/2001 |
| DE | 100 04 859 A1 | 9/2001 |
| DE | 100 50 168 C1 | 11/2001 |
| GB | 2 055 057 A | 2/1981 |
| WO | WO 99/46116 | 9/1999 |

* cited by examiner

*Primary Examiner*—Rena Dye
*Assistant Examiner*—Camie S. Thompson
(74) *Attorney, Agent, or Firm*—Brooks Kushman P.C.

(57) ABSTRACT

An interior lining component for a vehicle, in particular an inside roof lining, is provided. The interior lining includes at least one decorative layer forming a facing of the interior lining component, an intermediate layer covered by the decorative layer, and at least one support layer having a comparatively high flexural strength. The support layer includes at least one lower and one upper foam panel which are interconnected by pressing or press-moulding.

23 Claims, 1 Drawing Sheet

INTERIOR LINING COMPONENT

BACKGROUND OF THE INVENTION

1. Field of the Invention

The present invention refers to an interior lining component, in particular an inside roof lining, comprising at least one decorative layer forming a facing, an intermediate layer covered by said decorative layer, and at least one support layer having a comparatively high flexural strength.

2. Background Art

Such an interior lining component is provided in vehicles, e.g. on the inner side of a vehicle roof as a lining of said vehicle roof. In order to be able to fasten the lining component to the vehicle roof in a simple manner and to handle it easily, said lining component includes at least one support layer which has a comparatively high flexural strength and which is pre-formed in correspondence with curvatures of the vehicle roof, especially in the edge portions of said vehicle roof. This support layer has normally applied thereto an intermediate layer consisting of a comparatively soft material, over the whole area thereof. This soft material is intended to yield, when a passenger of the vehicle comes into contact with it, and to cushion respective impacts. For providing the interior lining component with a pleasing facing, the intermediate layer has additionally applied thereto a decorative layer which forms the facing with the side directed towards the passenger.

In the case of interior lining components known in practice it has turned out that it is difficult to adapt the support layer to complicated geometries of the vehicle roof and especially to curvatures in the edge portions of said vehicle roof by bending the support layer or by shaping it in a suitable manner. Furthermore, the known interior lining components only show a limited acoustic absorption so that they are unable to contribute much to sound insulation in the occupant cell of the vehicle.

SUMMARY OF THE INVENTION

It is therefore the object of the present invention to improve an interior lining component of the type mentioned at the start in such a way that an improved adaptability to geometries of e.g. the vehicle roof will be possible in combination with an increased acoustic absorption.

In connection with the features of the generic clause of claim 1, this object is achieved by the features that the support layer comprises at least one lower and one upper foam panel which are interconnected by pressing or press-moulding.

The use of at least two foam panels defining the support layer offers the possibility of providing the respective stiffness of the support layer by means of one foam panel and an increased acoustic absorption by means of the other foam panel. The foam panel imparting the stiffness can be thinner than support layers known in practice so that it will be possible to adapt the foam panel more easily even to complicated geometries without breaking it. In this connection, the predominantly acoustically effective foam panel can be adapted, independently of the other foam panel, for optimizing the acoustic effectiveness. A comparatively stiff foam panel and an acoustically effective foam panel are in this way essentially integrated in the interior lining component. For preventing the formation of a sound-reflecting boundary surface between the foam panels, said foam panels are interconnected by pressing.

For connecting both foam panels in this respect effectively and reliably, the lower and the upper foam panel can be interconnected by pressing along their whole area of contact.

Depending on the requirements to be fulfilled, it will be possible to implement the foam panels such that they have different material thicknesses. It goes without saying that, in this connection, it is not necessary that each individual foam panel has a uniform material thickness, but that it may also comprise areas of different material thicknesses, depending on the requirements to be fulfilled.

One embodiment of the interior lining component according to the present invention may be implemented such that, in comparison with the upper foam panel, the lower foam panel bordering on the cushioning layer has a material thickness which is smaller than or equal to the material thickness of said upper foam panel; the ratio of the material thicknesses of the lower and upper foam panels can be 0.1 to 0.9 and preferably 0.3 to 0.75 in this case.

The lower and thinner foam panel can define the foam panel which has a comparatively high flexural strength and which extends over the whole surface of the part of the occupant cell oil the vehicle which is to be provided with a lining. The upper and thicker foam panel can be implemented such that, in comparison with the lower foam panel, it has smaller dimensions and/or a different geometrical shape, i.e. it will also suffice to arrange the upper foam panel only in areas of the interior lining component where there is sufficient space for providing the lining component with the upper foam panel; especially in areas having a complicated geometry, said upper foam panel can also be omitted. Hence, there will be no necessity of pressing the two foam panels such that one thin foam panel is formed in such areas having a complicated geometry, whereby weight and design advantages will be obtained in comparison with the use of only one comparatively thick foam panel.

For producing less sound-reflecting layers in the case of the interior lining component according to the present invention and for effectively interconnecting the two foam panels at the same time, all layers of the interior lining component and in particular the foam panels can be interconnected by pressing in a one-step technology.

For stiffening the outer surfaces of the foam panels and for protecting them simultaneously against damage, a reinforcing mat can be applied to the back of the upper foam panel facing away from the lower foam panel and/or to the front of the lower foam panel facing the intermediate layer.

In the case of a simple embodiment, a cover fleece can be arranged on the side of the reinforcing mat facing away from the foam panel.

For obtaining a simple structural design of the intermediate layer and for connecting said intermediate layer effectively with the support layer, the intermediate layer can be formed of a cushioning layer and of a connection layer arranged on the cushioning-layer back which faces the lower foam panel.

For forming the support layer from a plastic foam having a compact outer skin, the foam panel can be formed of polyurethane or the like.

For simplifying the production of the support layer, the upper and the lower foam panel can consist of the same material.

For permitting variable properties Of the foam panels according to their functionality (stiffness/acoustic effectiveness), the lower and the upper foam panel may have different porosities.

The cushioning layer can preferably comprise a flexible soft foam layer.

In order to be able to connect the foam panels to one another and, especially in the case of the one-step technology, also the foam panel to the respective reinforcing mat or cover fleece, connection layers, in particular polyurethane adhesive layers, can be arranged between the individual foam panels and between the foam panels and the reinforcing mats. When pressing is carried out according to the one-step technology, the adhesive of the respective connection layers will penetrate through the reinforcing mats into the cover fleeces and into the foam panels and will thus form the firm composite after curing.

The cover fleeces can be a PET fleece or a PE/PET composite in accordance with one embodiment according to the present invention.

The reinforcing mats can be produced from glass and/or natural fibres.

The back of the interior lining component facing the vehicle part to be lined may additionally have a barrier foil applied thereto.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

In the following, a preferred embodiment of the present invention is explained in detail making reference to the enclosed figures in the drawing in which.

DETAILED DESCRIPTION OF THE PREFERRED EMBODIMENT

Figure 1:
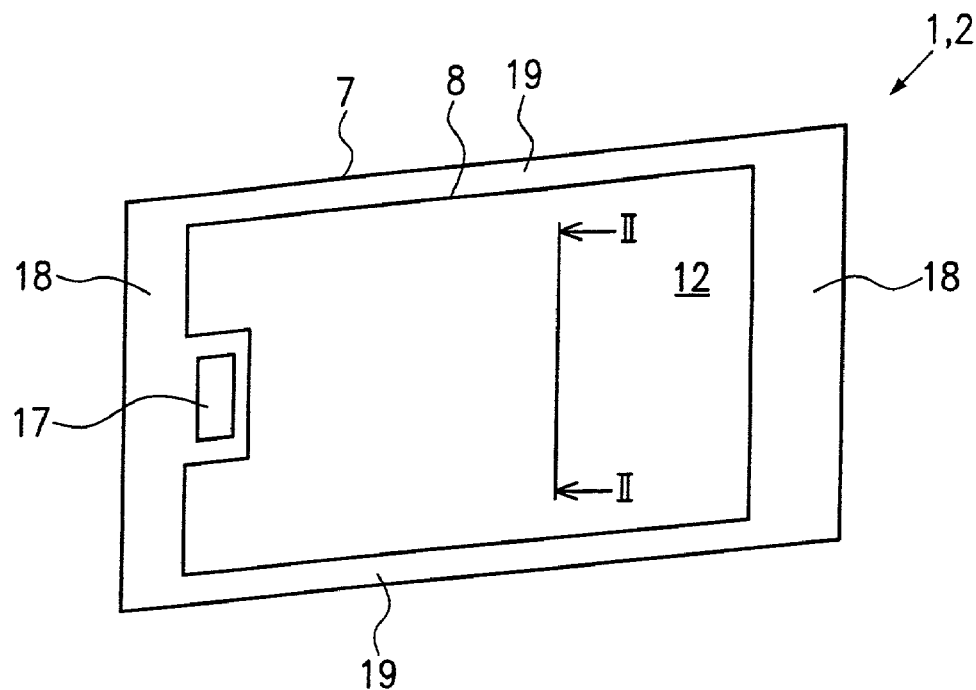
FIG. 1 shows a top view of an interior lining component according to the present invention.

FIG. 1 shows a top view of an interior lining component 1 according to the present invention, said interior lining component defining an inside roof lining 2. In FIG. 1 said inside roof lining 2 is visible from the side which would face an underside of the vehicle roof in the installed condition.

According to FIG. 1, the inside roof lining 2 comprises a lower foam panel 7 and an upper foam panel 8 arranged on the lower one. In FIG. 1, the back 12 of said upper foam panel 8 is visible, said back 12 having applied thereto a reinforcing mat 11 with a cover fleece 20. The upper foam panel 8 differs from the lower foam panel 7 with regard to its dimensions and its geometrical shape. The lower foam panel 7 extends beyond the upper foam panel 8 on all sides thereof whereby projecting areas 18 and 19 are formed. These projecting areas are adapted to be associated with bends or curvatures of the vehicle roof, that is e.g. with areas of the vehicle roof where said roof bends towards the doors and windows.

In one of the projecting areas 18, an opening 17 is formed in the interior lining component 1, the upper foam panel 8 ending in spaced relationship with said opening 17. The opening 17 e.g. serves to accommodate a roof lamp of the vehicle.

Figure 2:
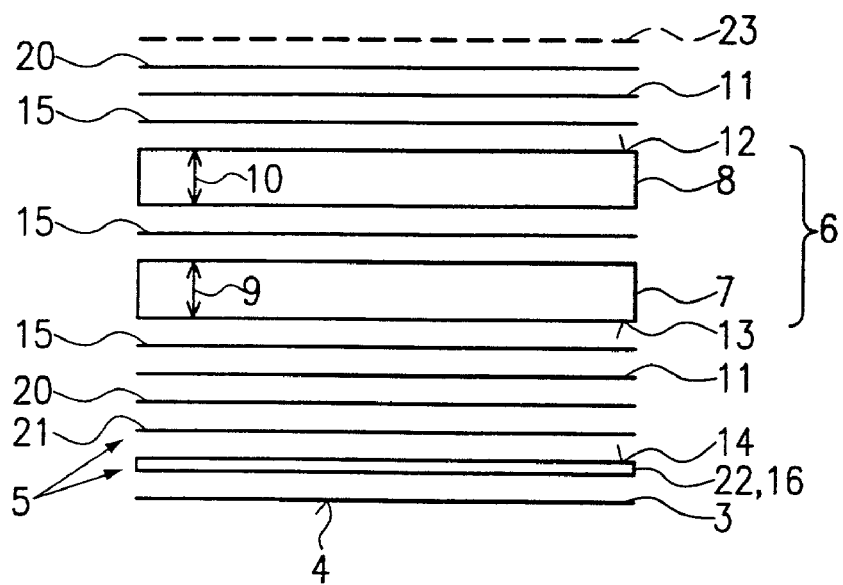
FIG. 2 shows a section along line II—II of FIG. 1.

FIG. 2 shows a section along line II—II of FIG. 1 in an enlarged, exploded view.

The lower and upper foam panels 7,8 form a support layer 6 having a comparatively high flexural strength. This support layer 6 provides a sufficient increase in the roof buckling resistance provided by the inside roof lining 2.

The lower foam panel 7 has a material thickness 9 and the upper foam panel 8 a material thickness 10. The material thickness 9 is smaller than the material thickness 10, the ratio of said material thicknesses being 0.1 to 0.9 and preferably 0.3 to 0.75. In the case of other embodiments the material thickness 9 can also be equal to or larger than the material thickness 10.

The back 12 of the upper foam panel 8 has applied thereto the reinforcing mat 11 and the cover fleece 20. A comparable reinforcing mat 11 with a cover fleece 20 is also applied to the front 13 of the lower foam panel 7. The reinforcing mats 11 are formed of fibres and the cover fleeces 20 are formed of PET or of a PE/PET composite. The reinforcing mat 11 and the cover fleece 20 can each extend over the whole surfaces of the foam panels 7,8.

Since the thinner foam panel 7 and the thicker foam panel 8 are interconnected by pressing in a so-called one-step technology, no boundary surface which would serve as a sound-reflecting layer will be formed between the two foam panels, whereby the acoustic absorption in the support layer 6 will be improved.

The front 13 of the lower foam panel 7 is connected to an intermediate layer 5 consisting of a cushioning layer 22 and a connection layer 21 via the reinforcing mat 11 and the cover fleece 20. The connection layer 21 is arranged on cushioning-layer back 14, which faces the lower form panel 7. The cushioning layer 22 is formed of a flexible soft foam layer 16 and the cushioning-layer side facing an occupant cell of the vehicle is provided with a decorative layer 3 consisting e.g. of a decorative material and forming a suitable facing 4. The intermediate layer 5 may also be applied only to subareas of the front 13, according to requirements. The back of the interior lining component 1, which faces the vehicle roof, may optionally have applied thereto a barrier layer 23.

The various adhesive or connection layers 15,21 are e.g. polyurethane adhesive layers. When the interior lining component 1 is pressed in one-step technology, the respective adhesive will penetrate through the reinforcing mats 11 into the cover fleeces 20 and also into the foam panels 7,8 and, after curing, it will form the firm composite.

While the best mode for carrying out the invention has been described in detail, those familiar with the art to which this invention relates will recognize various alternative designs and embodiments for practicing the invention as defined in the appended claims.

What is claimed is:

1. An interior lining component for a vehicle roof comprising at least one decorative layer forming a facing of the interior lining component, an intermediate layer covered by said decorative layer, a reinforcing mat, and at least one support layer adapted to be disposed proximate the vehicle roof, characterized in that the support layer comprises a lower and an upper foam panel having different porosities that are interconnected by pressing and the reinforcing mat is arranged on the upper foam panel facing away from the lower foam panel.

2. An interior lining component according to claim 1, characterized in that the lower and upper foam panels are interconnected along their whole area of contact.

3. An interior lining component according to claim 1, characterized in that the upper and lower foam panels have different material thicknesses.

4. An interior lining component according to claim 1, characterized in that in comparison with the upper foam panel, the lower foam panel bordering on the intermediate layer has a material thickness which is not greater than the material thickness of the upper foam panel.

5. An interior lining component according to claim 1, characterized in that a ratio of the material thicknesses of the lower and upper foam panels is 0.01 to 0.95.

6. An interior lining component according to claim 1, characterized in that the upper foam panel has a smaller lateral dimension than the lower foam panel.

7. An interior lining component according to claim 1, characterized in that all layers of the interior lining component are interconnected by pressing in a one-step technology.

8. An interior lining component according to claim 1, characterized in that a side of the reinforcing mat facing away from the lower and upper foam panels has a cover fleece arranged thereon.

9. An interior lining component according to claim 1, characterized in that the intermediate layer is formed of a cushioning layer and of a connection layer arranged on a cushioning-layer back that faces the lower foam panel.

10. An interior lining component according to claim 1, characterized in that the upper and lower foam panels are formed of polyurethane.

11. An interior lining component according to claim 1, characterized in that the upper and lower foam panels consist of the same materials.

12. An interior lining component according to claim 9, characterized in that the cushioning layer is a flexible soft foam layer.

13. An interior lining component according to claim 8, characterized in that the cover fleece is a PET fleece or a PE/PET composite.

14. An interior lining component according to claim 1, characterized in that the reinforcing mat contains glass.

15. An interior lining component according to claim 1, characterized in that a first connection is arranged between the upper and lower foam panels and a second connection layer is arranged between the support layer and the reinforcing mat.

16. The interior lining component of claim 1, wherein said pressing comprises press-moulding.

17. An interior lining component according to claim 1, wherein the support layer has a flexural strength greater than the decorative layer and the intermediate layer.

18. An interior lining component according to claim 1, wherein a ratio of material thicknesses of the lower and upper foam panels is in the range of 0.3 to 0.75.

19. An interior lining component according to claim 9, wherein the connection layer comprises a polyurethane adhesive.

20. An interior lining component according to claim 1, wherein the interior lining component defines an inside roof lining.

21. An interior lining component according to claim 1 wherein the lower foam panel provides stiffness and the upper foam panel provides acoustic absorption.

22. An interior lining component according to claim 1 wherein the upper foam panel provides stiffness and the lower foam panel provides acoustic absorption.

23. An inside roof lining for a vehicle, the roof lining comprising:
- at least one decorative layer forming a facing of the roof lining;
- an intermediate layer covered by the decorative layer, the intermediate layer including a cushioning layer;
- a first reinforcing mat disposed above the intermediate layer, the reinforcing layer comprising fibers;
- a support layer disposed above the first reinforcing layer, the support layer including a lower foam panel, an upper foam panel and an adhesive layer disposed between the foam panels for interconnecting the foam panels together, each foam layer comprising polyurethane; and
- a second reinforcing mat disposed above the support layer, the second reinforcing mat comprising fibers.

* * * * *